United States Patent [19]
Jochimski

[11] 3,860,404
[45] Jan. 14, 1975

[54] FILTER APPARATUS WITH MOVEMENT MEANS

[76] Inventor: Stefan Jochimski, 30 E. Oak St., Chicago, Ill. 60611

[22] Filed: Feb. 21, 1973

[21] Appl. No.: 334,272

[52] U.S. Cl................ 55/385, 55/387, 55/515, 131/238
[51] Int. Cl............................................. B01d 27/02
[58] Field of Search...... 55/385, 387, 515; 131/238, 131/240, 256

[56] References Cited
UNITED STATES PATENTS

| | | | |
|---|---|---|---|
| 2,308,947 | 1/1943 | Wanatik | 131/238 X |
| 2,788,085 | 4/1957 | Waller | 55/357 |
| 2,790,510 | 4/1957 | Brabec | 55/358 |
| 3,097,797 | 7/1963 | Crain | 131/238 UX |
| 3,417,549 | 12/1968 | Leosis | 55/387 X |
| 3,516,232 | 6/1970 | Gilbertson | 55/385 |

*Primary Examiner*—Tim R. Miles
*Assistant Examiner*—William Cuchlinski, Jr.

[57] ABSTRACT

A manually portable air-filtering apparatus having a housing with a perforate entry area at one end and a perforate outlet area at an opposite end, said housing having an interior electric suction fan and a removable filter-material container towards discharge through the outlet entry area.

5 Claims, 7 Drawing Figures

PATENTED JAN 14 1975
3,860,404
SHEET 2 OF 2
FIG. 5
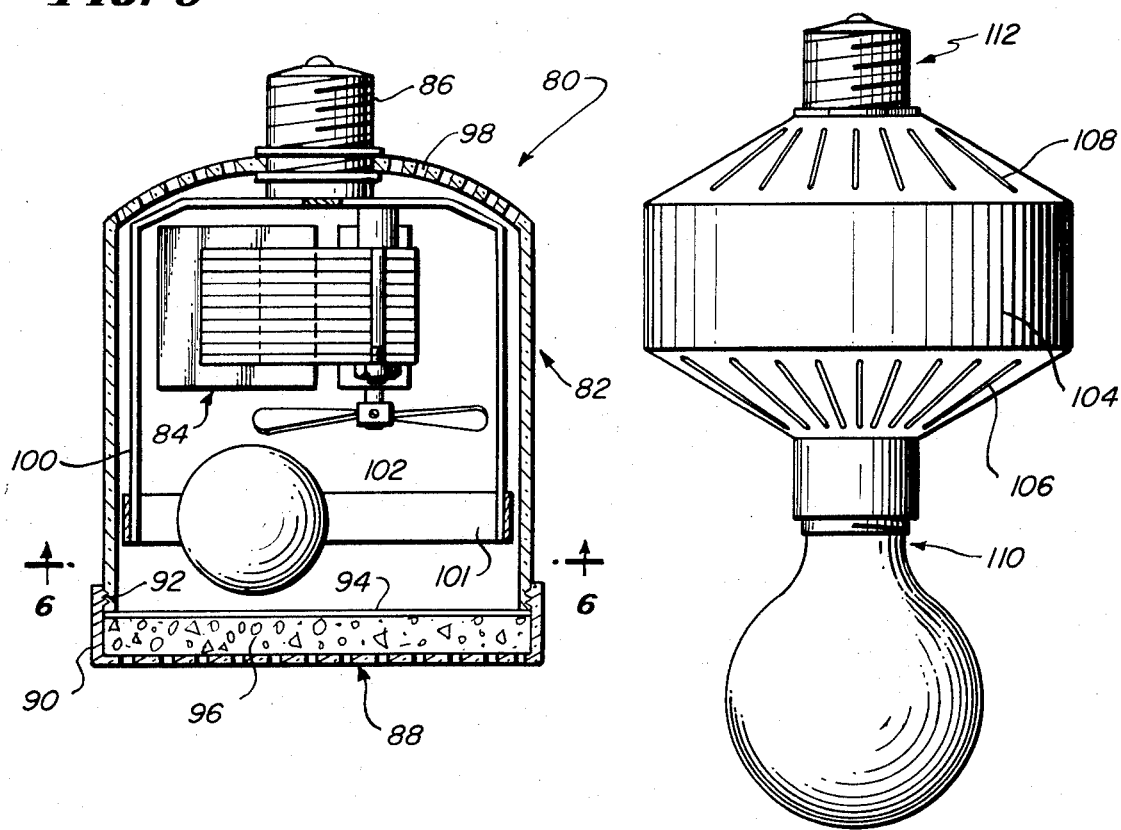
FIG. 7
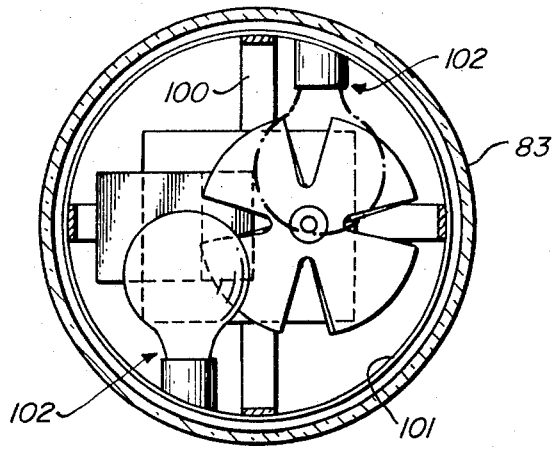
FIG. 6

FILTER APPARATUS WITH MOVEMENT MEANS

This invention relates to econonomical air-filtering apparatuses which are enconomically constructed, and which are easily moved and carried manually. The invention particularly relates to such smaller, lighter weight air filtering apparatuses which can be utilized to unique advantages in a variety of forms such as ashtray assemblies, DC mounted fixtures and AC mounted fixtures.

It is generally known that air filtering apparatuses may include a housing having an interior electric suction fan which moves air through an entry, past a filtering medium, and then discharges the filtered air through an outlet. It is one object of the present invention to utilize these known features in an improved apparatus which allows air filtering to take place in quick, efficient, and versatile applications. In particular, it is an object of the invention to provide smaller, lightweight filtering apparatuses which can be quickly connected to electrical AC and DC sockets.

It is another object of the invention to provide an improved air-filtering apparatus which utlizes features referred to in the prior art, but which advantageously incorporates such features in a small, light-weight unit which may be used more quickly and to greater advantage in a wide number of applications so that air in a house or vehicle may be filtered by utilizing the available electric sources without requiring modification or special connecting materials and equipment.

Still yet another important object of the present invention is to provide a small, light-weight apparatus which may be transported manually with ease, and which may be further quickly connected to conventional AC female sockets so that the unit may filter air and provide other functions, such as light illumination.

The foregoing objects are now attained together with still other objects which will occur to practitioners from time to time upon considering the disclosure of the invention, which includes drawings wherein:

FIG. 5 is a sectional side elevational view of an alternative embodiment useful for mounting to AC sockets conventionally provided in the home and in lighting fixtures;

FIG. 6 is a view taken along line 6—6 of FIG. 5; and

FIG. 7 is a side elevational view of an alternative embodiment joining the filtering apparatus with an exteriorly mounted illuminating bulb, as well as the male connecting plug for conventional AC sockets.

Use of the same numerals in the various views of the drawings will indicate a reference to like structures, parts, or elements as the case may be.

Figure 1:
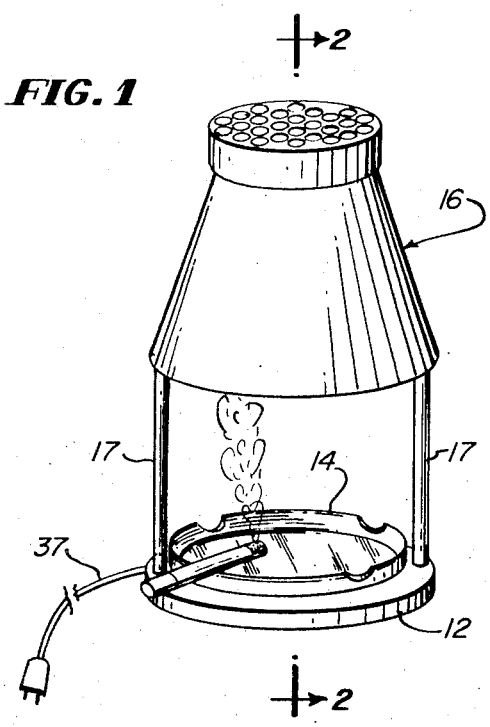
FIG. 1 is a perspective view showing the filtering apparatus in the embodiment of an ashtray assembly.
Figure 2:
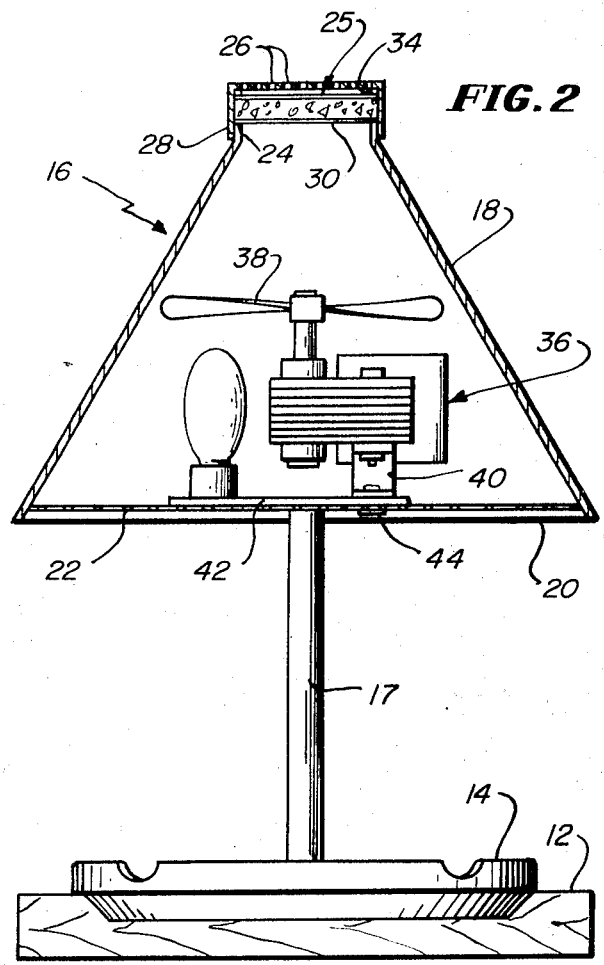
FIG. 2 is a sectional view taken along line 2—2 of FIG. 1, but on an enlarged scale.

Looking now at the drawings, an ashtray collector for pollutants is shown generally as 10, said collector having a base 12 on which is positioned an ashtray element 14. Above the ashtray element 14 is spaced a truncated cylinder housing supported by housing posts 17. The housing includes a continuous side wall 18 having a perforate entry area or base with a plurality of openings 22.

The top annular edge 24 of the housing supports a filter-material container 25, shown herein as a removable cartridge containing activated charcoal, said cartridge being handled by a user's hand. A perforate outlet area or top closure 26 has a continuous skirt 28 which frictionally engages upper portions of side wall 18 adjacent the top annular edge 24, so that said area is openable and closeable by a user's hand. The cartridge therein may be enclosed by permanently sealed wall portions, or the cartridge may have a removable cover or the like. The cartridge 25 is shown positioned by a ring spacer 34.

An electric suction fan shown generally as 36 is mounted within the housing, with its cord 37 extending out of the housing. Such fan has the conventional rotary blade or air impeller 38 as well as other conventional parts and elements which are not, however, described in detail. A bracket 40 is used to mount the electric suction fan to a support plate 42 placed on the perforate base 20. A fastner 44 secures the bracket 40 to the base plate 42.

Figure 3:
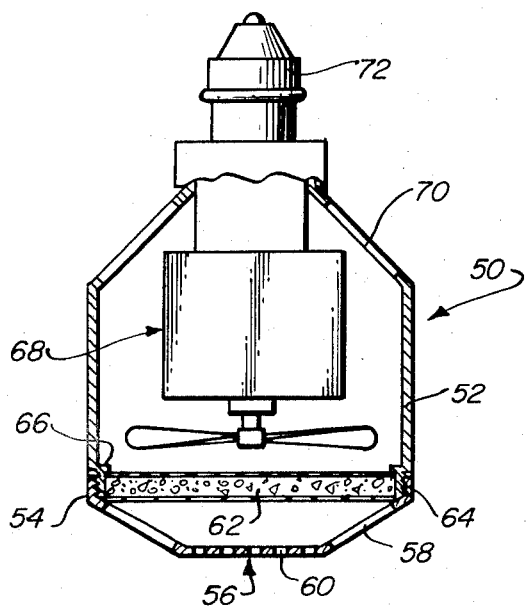
FIG. 3 is a side elevational view of an alternative embodiment, partly in section.
Figure 4:
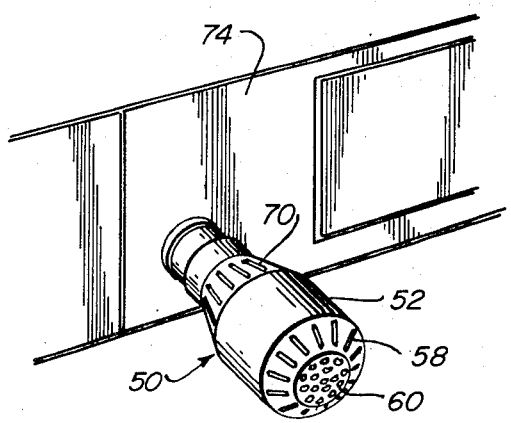
FIG. 4 is a perspective view of the filtering apparatus of FIG. 3, but on a reduced scale, in mounted position to a DC socket on an auto dashboard.

FIGS. 3 and 4 show an alternative embodiment wherein the filtering apparatus is shown as an automobile DC collector unit 50. The unit has a housing 52, a cover 54 having a perforate entry area 56 which includes tapered slot area 58 and central planar area 60. A removable filter container or cartridge 62 is provided with threaded side portions 64, and said container or cartridge is positioned by inset spacer ring 66.

The inside of the housing has an electric suction fan shown generally as 68 which moves air through a tapered slot outlet area 70. Electrical connection means extend outside the housing, and are shown herein as a DC male plug 72. This male plug engages a socket (not shown in detail) in automobile dashboard 74.

Similar air-filtering units are shown in the views of FIGS. 5 through 7, except that the electrical connection means outside the housing is adapted for AC connections. The apparatus shown generally as 80 operates as a fixture for household or the like AC sockets. The fixture includes a housing 82 having a continuous side wall 83, and an electric suction fan 84 which is mounted interiorly of the housing. A male plug 86 extends our of the housing and is adapted to engage AC sockets in a wall or a lamp, in the usual way.

The housing has a perforate entry area cover 88 which has a skirt 90 with interior threads 92 which engage matching threads on the outside of the side wall 83. The filter-material container is likewise shown as a cartridge formed, in part, by an imperforate circular wall 94 to hold the activated charcoal granules 96 between such wall 94 and the perforate portion of cover 88. The housing is shown to have a somewhat arcuate circular outlet area 98 at the end opposite to the inlet perforate area.

The housing interior is also shown as being provided with an incandescent light bracket 100 and a ring 101 to which is mounted lightbulb and socket assembly 102. Mounting the unit to an AC socket, therefore, results in illuminating the lightbulb as well as moving air for filtering. It is seen that such embodiments can be mounted to the female sockets of ordinary lamp fixtures to provide both light and to filter air, as when social gatherings occur with characteristic tobacco smoking. While not shown, it should be understood that separate electrical switch means can be provided on the units for independently controlling the lightbulbs and the electric fan after the male plug is engage to an AC socket. Such switch means may be readily devised by practitioners.

A related filtering and lighting apparatus is shown in the view of FIG. 7 as including a cylindrical housing part 104 flanked by a lower tapered perforate entry area 106 and an upper tapered perforate outlet area 108. The lightbulb and socket assembly 110 is shown adjacent the perforate entry area and the male plug for AC socket mounting is shown adjacent the perforate outlet area 108. Conventional electrical connections are provided within the housing for the electric suction fan and the plug and socket.

The small, light-weight apparatus disclosed herein is easily handled and mounted in various uses. The housing is preferably formed from light-weight plastic with openable and closeable parts at either the entry or outlet areas, depending on the connections and placement of the form and by any other ancillary features. The cartrige is also preferably provided in plastic form which can be quickly removed and replaced by the hand of the user, such cartridge or filter material housing being easily grasped by the user's hand.

What is claimed is:

1. A small, lightweight apparatus for moving air to be filtered therethrough, including
   a housing,
   a perforate entry area at one of the housing ends,
   an electric suction fan means positioned within the housing,
   an electrical male connection plug on one end of the housing, to engage a female electrical socket,
   a removable filter-material container positioned to one side of said electric suction fan to intercept the air moved by said electric suction fan,
   a perforate outlet area on said housing on the other side of said electric suction fan means, said filter container held easily in a user's hand and such filter container positioned within the cap and being removable with said cap, said filter material being activated charcoal, and
   a cap releasably mounted on the end of the housing opposite to the end with the male connection plug, in such a manner so as to be openable and closeable by a user's hand to disengage and engage the end of the housing to quickly remove and replace said filter-material with a user's hand.

2. An apparatus which includes the features of claim 1 above, wherein said male plug is adapted to fit a household AC socket.

3. An apparatus which includes the features of claim 2 above, wherein an electric lightbulb assembly is electrically joined to said fan so that the bulb assembly may be lighted as the fan is operating.

4. An apparatus which includes the features of claim 1 above, wherein said plug is a DC male plug adapted to fit a DC socket.

5. An apparatus which includes the features of claim 4 wherein said DC male plug is dimensioned to fit an automobile dashboard DC socket.

* * * * *